United States Patent [19]
Crawley

[11] 3,863,512
[45] Feb. 4, 1975

[54] SHIFT MECHANISM FOR DERAILLEUR DRIVE

[75] Inventor: James W. Crawley, Woodland Hills, Calif.

[73] Assignee: California Progressive Products, Inc., Manhattan Beach, Calif.

[22] Filed: Nov. 9, 1973

[21] Appl. No.: 414,146

[52] U.S. Cl. ............................................. 74/217 B
[51] Int. Cl. ............................................ F16h 11/04
[58] Field of Search ................................. 74/217 B

[56] References Cited
UNITED STATES PATENTS
1,032,245   7/1912   Smith ............................. 74/217 B

*Primary Examiner*—Leonard H. Gerin
*Attorney, Agent, or Firm*—Alfred W. Kozak

[57] ABSTRACT

A mechanism involving a bicycle gear shifting apparatus for use with a multiple sprocket gear cluster at the axle of the rear wheel of a bicycle operating on the derailleur principle. An idler assembly is provided adjacent the multiple gear sprocket cluster, wherein a pair of idler sprocket gears are mounted on a movable carrier. Power from the drive chain, which moves the pair of idler sprocket gears, is used to drive an upper and lower set of gears connected to the respective upper and lower idler sprocket gears. Centrally between the upper and lower gears is a central or "floating" gear which is displaceable from a neutral position into engagement with either the upper or lower gears. When the central gear is displaced to engage either the upper or lower gear, it connects the power train to a driving gear which drives a Leadscrew, threaded so as to cause the movable carrier to move in one direction or the other (towards or away from the rear bicycle wheel). The motion of the carrier displaces the two idler sprocket gears and displaces also the drive chain on the idler sprocket gears so as to carry the chain into engagement with a different sprocket gear on the multiple sprocket gear cluster. Thus, by directing the central "floating" gear from its neutral disengaged position into engagement with either the upper or lower gears, the carrier, together with the drive chain, is caused to move in a desired direction until the chain engages with a desired one of the multiple sprocket gears, at which time the central gear is released to its neutral disengaged "floating" position.

20 Claims, 6 Drawing Figures

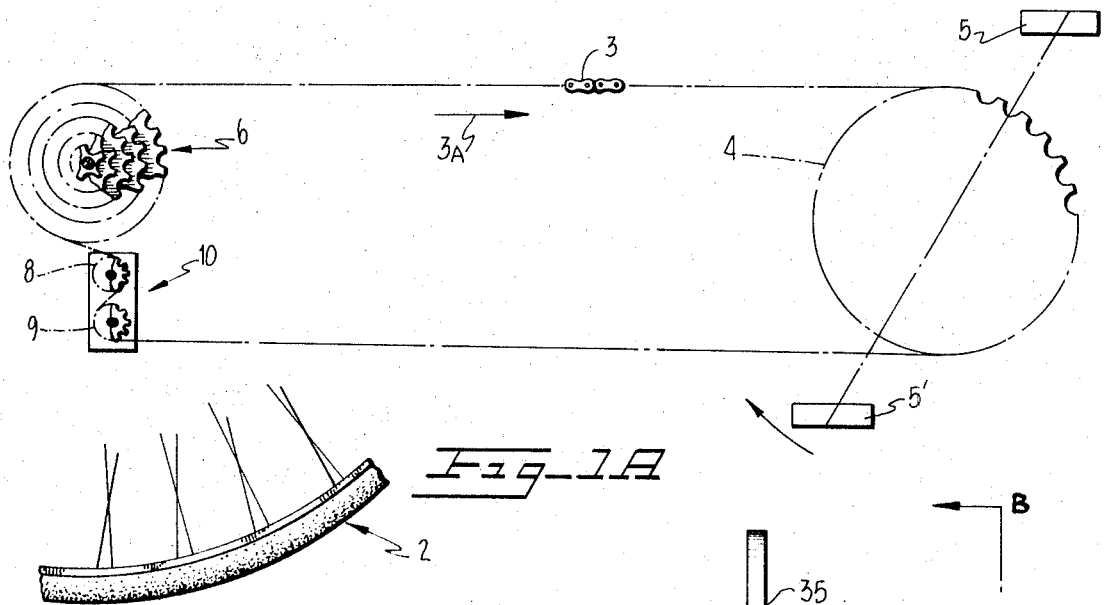
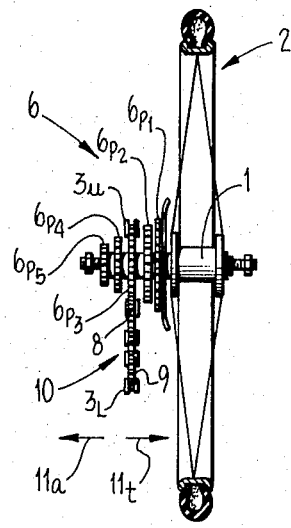
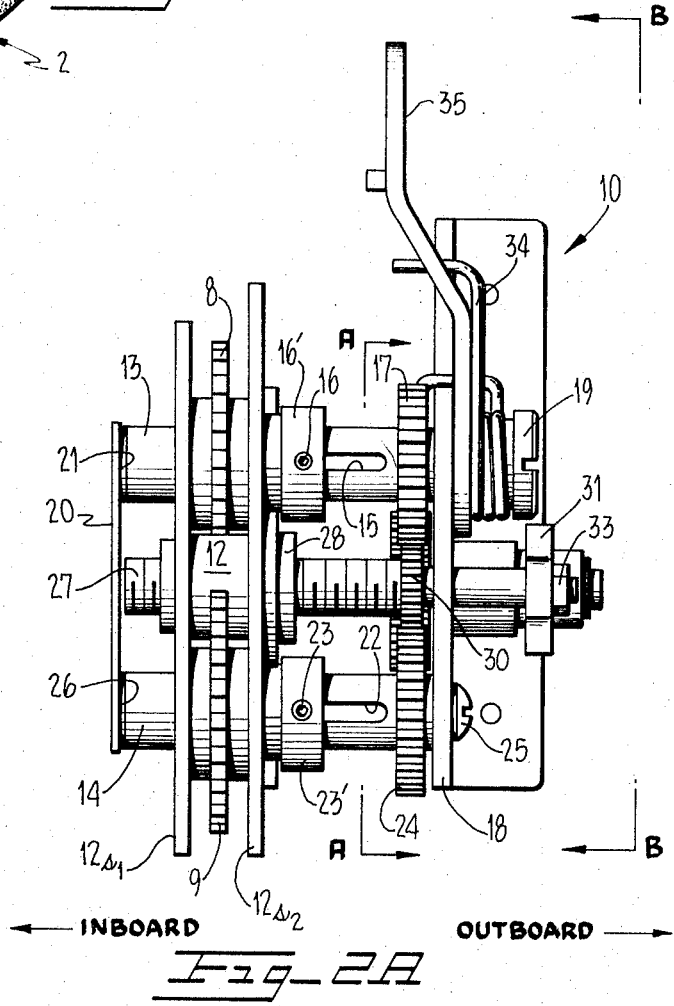

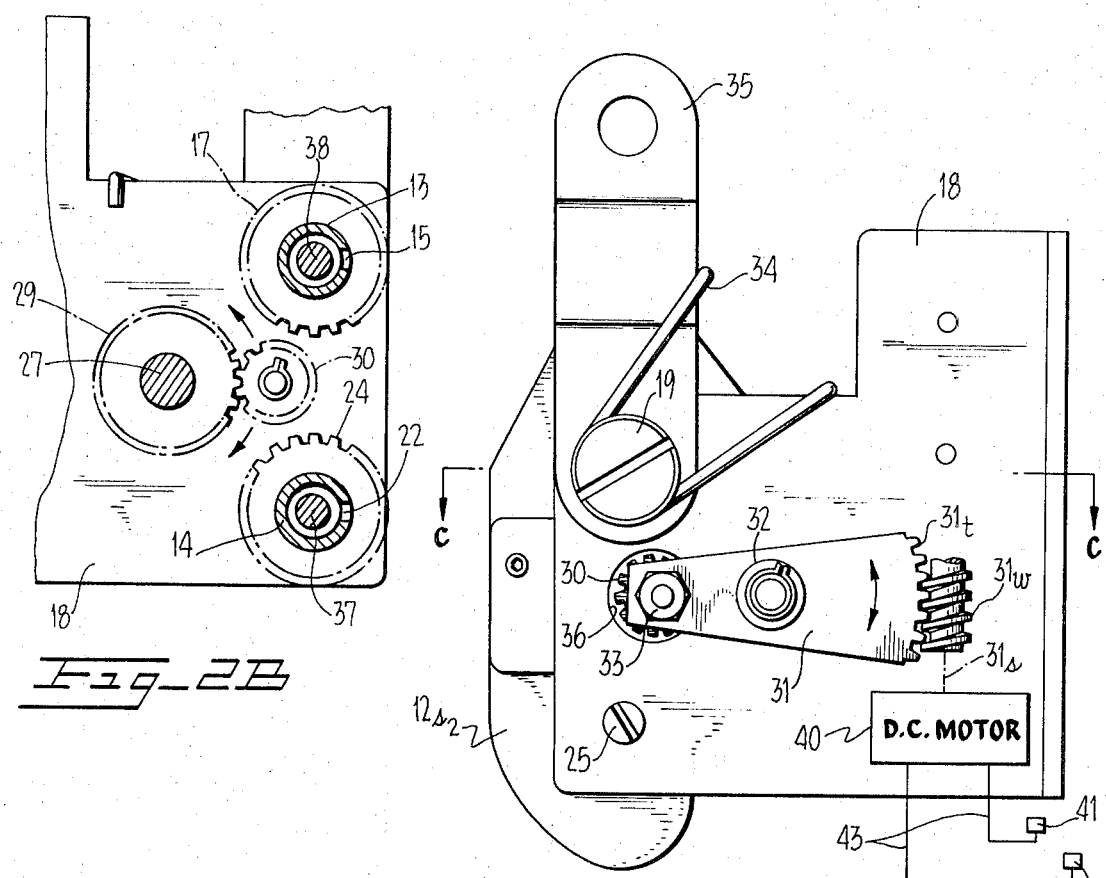
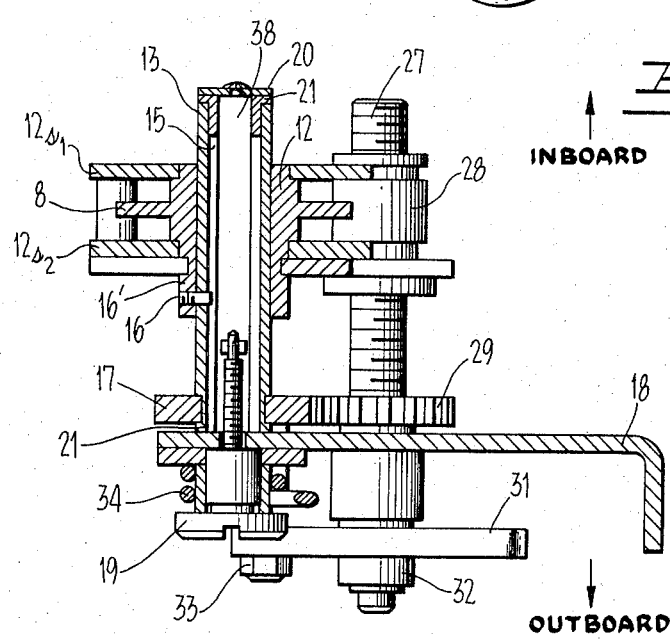

SHIFT MECHANISM FOR DERAILLEUR DRIVE

BACKGROUND

In recent years, with the growing popularity of the bicycle, there has come to be a greater demand for and usage of bicycles operating on the variable ratio power drive principle commonly called the derailleur drive. Basically, this principle allows for changing the ratio of sprocket gears as between the forward drive sprocket (operated by foot pedal power) and the rear multiple cluster of sprocket gears laterally placed one to the other with a variety of diameters. A mechanism is provided whereby the drive chain may be derailed at the rear cluster from one sprocket gear to the next. Some of these systems also provide for sprocket gear change at the forward sprocket.

These bicycle derailleur gear shifting mechanisms in the prior art have presented a series of problems in actual operation such as the following:

1. The inability of the operator to position the bicycle drive chain precisely in line with a selected sprocket gear of the rear sprocket cluster for the purpose of derailing the drive chain to the selected sprocket when effecting a gear change.

2. The inability of the operator to recognize whether or not the bicycle drive is accurately positioned after the gear change is effected, as there still may be some offset.

3. The awkward and potentially dangerous utilization of auxiliary gear shifting levers which are generally located remote from the handlebar grips and which require the operator to release his hold on the handlebar grip steering mechanism in order to operate the gear-shifting lever.

The mechanism of the present invention overcomes the problems posed by prior art devices and the problems enumerated above. The gear-shifting apparatus disclosed herein provides for more positive, more precise, and more effective control of the derailing and shifting of the bicycle drive chain by either mechanical, electromechanical, hydraulic or other means. For example, electromechanical control can enable finger-tip push-button gear changing without necessitating the removal of either hand from the handlebar (as in the prior art) to shift a gear shift lever located remotely from the handlebar grip.

The disclosure of the present invention describes an idler assembly mechanism for attachment adjacent to the rear multiple sprocket gear cluster wherein simple positive means are provided for shifting the drive chain from any sprocket gear to any other desired sprocket gear quickly, positively and without offset or uncertainty. The described idler assembly mechanism is a unit within itself having an activating means which may be activated through a mechanical, electrical, hydraulic or other device which is triggered by the operator near the steering mechanism, that is, the handlebars adjacent the operator's fingertips.

SUMMARY OF THE INVENTION

In view of the problems and deficiencies of bicycle gear changing presented by the prior art, the present invention provides a simple, easy to assemble, and inexpensive apparatus for the positive and easy change of derailleur gears in a bicycle power drive system.

Briefly, there is provided an idler assembly unit attachable adjacent and below the multiple gear cluster wherein a movable carrier supports upper and lower idler sprocket gears in an idler assembly unit. The upper and lower idler sprocket gears are supported by upper and lower rods each of which has an upper and lower gear on the outboard end of the rods and wherein the turning of the idler sprocket gears will turn the respective upper and lower gears.

The movable carrier is provided with a threaded sleeve which mounts around a threaded Leadscrew such that, if the Leadscrew turns, it will cause the carrier (and its associated idler sprockets) to move in a direction determined by the direction of rotation of the Leadscrew. The Leadscrew is provided with a drive gear also at the outboard end, which gear is normally not connected to any source of power or motion. Mounted between the upper and lower gears and enmeshed with the Leadscrew drive gear, is a "floating" central gear which is mounted on a movable lever arm on the outboard side of the idler assembly. This lever arm can be actuated (by means of mechanical, electrical, hydraulic, or other power) to engage either the upper or the lower gears which are driven by the upper or lower idler sprockets through the rotatable support rods. Engagement of the central "floating" gear with the upper gear will cause turning of the Leadscrew such that the carrier is driven inboard toward the rear wheel which will control the derailing of the drive chain inwardly toward the rear wheel. Contrariwise, should the central floating gear connect the lower gear to the drive gear of the Leadscrew, then the carrier motion is in the opposite direction, that is, away from the rear wheel in the outboard direction; and the control effect is to derail the drive chain outboard toward a smaller diameter sprocket gear of the multiple cluster.

Thus, it is possible, by the mere activation of a lever arm (whether done via mechanical, electric or other means) to derail the drive chain in an outboard or inboard direction in order to connect a different gear ratio on the drive chain. Further, by merely deactivating the lever arm to the neutral or "float" position, all further derailing action is stopped and the carrier with its idler sprockets and drive chain will remain in fixed position in the desired gear ratio condition.

BRIEF DESCRIPTION OF THE DRAWINGS

FIG. 1A is a schematic drawing of the power driving linkage of a derailleur bicycle system indicating the foot pedal force empowering the front sprocket and the drive chain connecting the rear multiple gear cluster and the idler assembly beneath it.

FIG. 1B is a cross-sectional view of the rear wheel of the bicycle system showing in greater detail the multiple gear sprocket cluster and the idler sprocket gears of the idler assembly underneath.

FIG. 2A is a detailed view in elevation of the component items making up the idler assembly unit.

FIG. 2B is a cross-section cutout view of a portion of the idler assembly taken along the line A—A.

FIG. 3A is a view, in elevation, of one side of the idler assembly (outboard side) illustrating the mounting of the central floating gear on a movable lever arm. (This is taken along line B—B of FIG. 2A.)

FIG. 3B is a plan view of the idler assembly unit illustrating how the carrier is driven by the Leadscrew and also showing the upper idler sprocket gear connected to the carrier. (This is taken along line C—C of FIG. 3A.)

DESCRIPTION OF THE PREFERRED EMBODIMENT

With reference to FIG. 1A, there is shown the power delivery train for a derailleur type bicycle gear shifting mechanism. Foot pedals 5 and 5' are used to turn the forward drive sprocket gear 4 which drives the drive chain 3 in the direction indicated by arrow 3A. The drive chain 3 (upper portion) rides on a smaller sprocket gear on the rear sprocket gear cluster 6. It rides over upper idler sprocket gear 8 and lower idler sprocket gear 9 which are mounted on the idler assembly unit 10, after which the drive chain 3 connects to the lower side of the forward drive sprocket 4.

Looking from the front of a bicycle toward the rear wheel, FIG. 1B shows the rear wheel 2 having an axle 1 and onto which is mounted the gear cluster 6 having five rear sprocket gears emplaced laterally and shown as elements $6p1$, $6p2$, $6p3$, $6p4$, and $6p5$. The drive chain 3 is shown in FIG. 1B in its upper portion at $3u$ and at its lower portion at $3L$. Adjacently below the rear sprocket gear $6p3$ is a portion of the idler assembly unit 10 showing the upper idler gear sprocket 8 and the lower idler gear sprocket 9. Arrow $11a$ indicates the direction of outboard motion (away from the rear wheel) while arrow $11t$ shows the direction of inboard motion toward the rear wheel.

The entire idler assembly unit 10 is shown in FIG. 2A wherein the upper and lower idler sprocket gears 8 and 9 are mounted on rods 13 (upper) and 14 (lower), respectively. The upper and lower rods 13 and 14 are supported between the outboard idler assembly plate 18 and the inboard assembly plate 20. Upper bearing 21 and lower bearing 26 support the inboard ends of rods 13 and 14.

The upper rod 13 and lower rod 14, respectively, have horzontal slots 15 and 22. Riding on rods 13 and 14 are upper and lower sleeves 16' and 23', respectively. These sleeves are held in position by pins 16 and 23 which are inserted through slots 15 and 22 so that the sleeves may slide or move along the length of the rods.

The upper and lower sleeves 16' and 23' are part of carrier unit 12 which is a movable mechanism supporting the upper and lower idler sprocket gears 8 and 9. Also attached to and part of the carrier unit 12 is a threaded sleeve 28 which mounts upon a central Leadscrew 27. The Leadscrew 27 is a threaded bolt inserted in the sleeve 28 and which Leadscrew bolt is mounted on the outboard idler assembly plate 18. The outboard end of the Leadscrew 27 is provided with a drive gear 29 (see FIG. 3B), which gear 29 rides in engagement with a "floating" central gear 30.

The carrier unit 12 has respective inboard and outboard sideplates $12_{s1}$ and $12_{s2}$.

The floating gear 30 is supported by a mounting 33 which is held by one end of a lever arm 31 (also shown in FIG. 3A).

Screw 25 holds lower rod support 37 (see FIG. 2B) to the outboard idler assembly plate 18.

Screw 19 holds upper rod support 38 (see FIG. 2B) and also serves to hold spring 34 (FIG. 2A) which helps to provide proper tension to the idler assembly and idler sprocket gears (upper and lower) so as to provide adequate tension to hold the drive chain 3 against the idler sprocket gears 8 and 9.

A cross-sectional cutout, looking outboard (along section AA of FIG. 2A) is shown in detail in FIG. 2B. Referring to FIG. 2B, the outboard idler assembly plate 18 supports the upper and lower gears 17 and 24, in addition to supporting the Leadscrew drive gear 29 which is set to continuously engage the "floating" gear 30. Also seen in FIG. 2B are upper and lower rods 13 and 14 having their respective slots 15 and 22. Rod supports 38 and 37 are seen mounted through the upper and lower rods 13 and 14. The Leadscrew 27 is shown connected to the drive gear 29 which engages the floating gear 30.

Referring to FIG. 3A, there is seen a side view, in elevation, of the outboard idler assembly plate 18. This is taken from section BB of FIG. 2A. A pivot bearing 32 mounts a lever arm 31 on one end of which is a mounting 33 which holds the floating gear 30. A cutout 36 on plate 18 permits the lever arm 31 to position the floating gear 30 from its normal neutral position into an elevated or depressed condition where it may connect either to upper gear 17 or lower gear 24. Lever arm 31 may be provided with gear teeth $31_t$ which can be driven by electric motor means. Alternatively, lever arm 31 may be actuated by mechanical, hydraulic or other means.

FIG. 3A indicates a worm gear $31_w$ for driving the teeth $31_t$ of lever arm 31. A shaft $31_s$ connects the worm gear to a D.C. motor 40 which has wires 43 connected to button switches 41 and 42 (located preferably on the bicycle handlebars adjacent the fingers of the operator). The button switches 41 or 42, when actuated, serve to drive the worm gear $31_w$ in one direction or the reverse, depending on which button switch is pressed. Thus the central floating gear 30 may be raised or lowered.

In this view of FIG. 3A, the outboard side $12_{s2}$ of the carrier unit 12 is seen protruding behind the plate 18. Also tension spring 34 is held by screw 19 and plate extension 35 is provided for mounting the idler assembly unit to the frame of the bicycle.

Referring to FIG. 3B, there is seen a plan view of the idler assembly 10 by taking a cutout CC from FIG. 3A. With reference to FIG. 3B, there is seen the outboard plate 18, the Leadscrew 27 and its driving gear 29. Plate 18 also supports pivot bearing 32 which holds lever arm 31 having the mount 33 for the floating gear 30 (not seen here). Plate 18 also supports screw 19, upper rod support 38, and upper rod 13 (as well as lower rod 14, (not seen here). Carrier unit 12 is shown with its inboard side $12_{s1}$ and its outboard side $12_{s2}$. Within the carrier unit 12 is seen the upper idler sprocket gear 8.

Upper carrier sleeve 16' is held in place by pin 16 and slides along slot 15. The outboard end of upper rod 13 is connected to upper gear 17. The inboard end of upper rod 13 is held by the bearing 21 and inboard plate 20.

OPERATION

Referring to FIG. 1A, motive power is applied to foot pedals 5 and 5' through the agency of a bicycle rider, thus turning sprocket 4 in the clockwise direction, along with the sprocket chain 3.

Sprocket chain 3 connects to the idler assembly unit 10 where it turns lower idler sprocket 9 clockwise and upper idler sprocket 8 counterclockwise. The chain 3 then connects to one of the rear sprockets as, for example, sprocket 6p3 (of FIG. 1B), which is connected to axle 1.

Sprocket 6p3 is driven clockwise and causes rear wheel 2 to also be driven clockwise providing forward motion to the vehicle or bicycle.

Referring to FIG. 3A, the lever arm 31 is seen residing in its neutral or float position, which means that the floating gear 30 (better seen in FIG. 2B) makes no connection to gears 17 and 24 but merely stays in contact with Leadscrew drive gear 29. This represents a condition of stasis or no-change in regard to the gear ratios used to drive the rear wheel 2.

Lever arm 31 is, however, movable about pivot 32 (FIG. 3A) by means of force which can be applied at the lever arm teeth area $31_t$. For example, a miniature D.C. motor 40 with output worm gear $31_w$ may be connected to the lever arm gear teeth $31_t$ and such miniature motor may be switched so as to drive teeth $31_t$ in the upward or the downward direction. Alternatively, the teeth $31_t$ or the lever arm 31 itself may be actuated by a wire cable, a hydraulic device or other actuating means. The control for any of these actuating devices would be accomplished by control means located adjacent the rider's hands in a convenient position, causing minimum disturbance to the rider's control of the steering and without significant distraction of his forward view.

In FIG. 3A the lever arm teeth $31_t$ are shown connected to worm gear $31_w$ which is driven by miniature motor 40. Actuation switches 41 and 42 connect to motor 40 via wires 43 to control motion in the desired inboard (lower gear ratio) or outboard (higher gear ratio) direction.

Should the rider desire to shift to a lower gear ratio, as for climbing a steeper grade, he would operate his actuation means to, for example, cause the lever arm 31 to move downward at $31_t$, thus causing the floating gear 30 to move upward, thus making gear 17 (FIG. 2B) connect with Leadscrew gear 29. Now since the idler sprocket 8 is being driven by the drive chain 3, and the sprocket 8 is continuously turning its end gear 17, then gear 17 transmits rotary power to the Leadscrew drive gear 29 to cause the carriage 12 to move inboard toward sprocket 6p2 (FIG. 1B).

Since carriage 12 and its idler sprocket 8 and 9 carry the drive chain 3, then drive chain 3 is carried over into engagement with the rear sprocket 6p2, at which time the lever arm 31 is returned to its neutral or float position so that no more lateral drive motion is transmitted to the carriage 12 of the rear idler assembly 10.

Likewise, should the rider desire a higher drive ratio as on a long flat straightaway, he would actuate lever arm teeth $31_t$ in the upward direction which would move floating gear 30 downward and cause power engagement between the lower gear 24 (FIG. 2B) and the Leadscrew gear 29. In this case, the carriage 12 would be driven in the outboard direction taking the drive chain 3 over into engagement with a smaller rear sprocket such as 6p4 (FIG. 1B) after which lever arm 31 and floating gear 30 would again be returned to the neutral or float position.

Thus, the rider or operator, by means of his remote actuation means, can control the position of lever arm 31 and floating gear 30 to cause the drive chain 3 to be moved toward the inboard or outboard direction until a new rear drive sprocket is engaged, after whicch he can return the floating gear 30 to the neutral or non-shift position. The lever arm 31 may be spring loaded to bias itself normally in the neutral or float position, so that only positive actuation of the lever arm 31 will cause rotary power (from upper and lower gears 17 and 24) to be applied to the carriage 12 and the drive chain 3.

What is claimed is:

1. In a derailleur gear changing mechanism including a main drive sprocket, a plurality of rear sprocket gears, and a connecting drive chain, a mechanism comprising:
   a. means for laterally displacing said drive chain by means of power derived from the motion of said drive chain.

2. The mechanism of claim 1 including
   b. activation means for controlling the application or non-application of power from said motion of said drive chain.

3. The mechanism of claim 2 wherein
   c. said activation means includes the capability of determining the lateral direction of displacement of said drive chain.

4. The mechanism of claim 1 including
   d. means for causing said drive chain to disengage a given rear sprocket gear and then to engage and stay in engagement with a desired rear sprocket gear.

5. In a derailleur gear changing mechanism including a main drive sprocket, a plurality of rear sprocket gears, and a connecting drive chain, an idler assembly comprising:
   a. a movable carrier unit for carrying idler gears;
   b. first and second idler sprocket gears mounted on said carrier unit, said sprocket gears being in engagement with said drive chain;
   c. means for lateral displacement of said carrier unit empowered by motion of said drive chain;
   d. activation means to start and stop the lateral displacement of said carrier unit.

6. The idler assembly of claim 5 including:
   e. mounting means for mounting said idler assembly adjacent said plurality of rear sprocket gears to permit continuous engagement of said drive chain with said first and second idler gears and with at least one of said plurality of rear sprocket gears.

7. The idler assembly of claim 5 including:
   f. first and second hollow rods;
   g. first and second end gears mounted respectively on said rods; wherein said carrier unit is slidably mounted on said first and second hollow rods, said hollow rods being mounted for turning together with the rotation of the first and second idler gears.

8. The idler assembly of claim 7 wherein said first and second idler sprocket gears are rotated in opposite directions by motion of the said drive chain whereby said direction of rotating motion is transmitted to respective first and second end gears at one end of each of said hollow rods.

9. The idler assembly of claim 7 wherein said means for lateral displacement of said carrier unit includes a Leadscrew, and wherein said carrier unit is laterally displaced by the direction of and the amount of turning of said Leadscrew.

10. The idler assembly of claim 9 wherein said Leadscrew includes a drive gear at one end thereof, and wherein said activation means includes a displaceable gear, said gear being displaceable from a neutral floating position, and said gear remaining in continuous engagement with said Leadscrew drive gear.

11. The idler assembly of claim 10 wherein said displaceable gear is displaceable from a neutral position to engage either the said first end gear or the said second end gear so as to transmit rotary power from said first or said second idler sprocket gear to the said Leadscrew to cause said Leadscrew to move said carrier unit in a first direction or an opposite direction.

12. The idler assembly of claim 11 wherein said displaceable gear is settable to a neutral position whereby no power can be transmitted from said first and second idler gears to said Leadscrew thus enabling said carrier unit and its idler sprocket gears to remain in a fixed position in relation to the said plurality of rear sprocket gears.

13. In a bicycle gear shift mechanism using the derailleur principle, the combination comprising:
 a. a foot-pedal powered main drive sprocket gear for moving a drive chain;
 b. a plurality of varying diameter rear sprocket gears arranged laterally and connected to drive a rear bicycle wheel;
 c. an idler assembly adjacent said rear sprocket gears, said idler assembly including first and second idler sprocket gears;
 d. a drive chain connecting said main sprocket gear with one of said plurality of rear sprocket gears and with each of said first and second idler sprocket gears;
 e. said idler assembly including means for laterally shifting said drive chain with power solely derived from motion of said drive chain.

14. The mechanism of claim 13 wherein said idler assembly includes means for disengaging said drive chain from a given rear sprocket gear and causing it to engage with and fixedly connect onto a desired one of said plurality of rear sprocket gears.

15. The mechanism of claim 13 wherein said idler assembly includes means to start and stop the lateral shifting of said drive chain.

16. In a bicycle gear shift mechanism including a main drive sprocket, a plurality of rear sprocket gears, and a connecting drive chain, an idler assembly comprising:
 a. first and second idler sprocket gears mounted adjacently below said plurality of rear sprocket gears;
 b. a laterally movable carrier unit supporting said first and second idler gears;
 c. means for causing said carrier to move laterally for a specified distance in a specified direction and then to remain in a specified position, said means for causing said carrier to move being soley empowered by the motion of said drive chain.

17. The idler assembly of claim 16 wherein said means for causing said carrier to move laterally for a specified distance in a specified direction and then to remain in a specified position includes:

c-1. a Leadscrew whose direction and duration of turning regulates the lateral motion of the said carrier unit;
c-2. a first and second end gear connected to said first and second idler gears which are turned by said drive chain motion;
c-3. a displaceable floating gear settable in a neutral, a first, and a second position;
wherein there is no transmission of turning power to said Leadscrew when the displaceable floating gear is in the neutral position, and wherein there is a direct transmission of power to said Leadscrew when the displaceable floating gear is in the first or second position.

18. The idler assembly of claim 16 including a mounting plate to hold said idler assembly adjacent to said plurality of rear sprocket gears; and
spring tension means between said mounting plate and said idler assembly.

19. The idler assembly of claim 17 including means for setting said displaceable floating gear in a desired position for a desired duration.

20. In a gear shift mechanism using the derailleur principle, the combination comprising:
 a. a main drive sprocket;
 b. a plurality of sprocket gears capable of delivering power to an output shaft;
 c. an idler assembly adjacent said plurality of sprocket gears and having first and second idler sprocket gears;
 d. a drive chain connecting said main drive sprocket, said plurality of sprocket gears, and said first and second idler sprocket gears;
 e. said idler assembly additionally including:
  e-1. a mounting plate supporting first and second rods, a Leadscrew, and a pivotable lever arm;
  e-2. said first and second rods being axially turnable through connection to said first and second idler gears, each of said rods having an end gear at one end thereof;
  e-3. said Leadscrew being turnable through a drive gear at one end thereof;
  e-4. a displaceable floating gear mounted on one end of said lever arm and being in engagement with said Leadscrew drive gear;
  e-5. said displaceable floating gear being settable into engagement with said first or said second end gear,
 wherein the motion of said first or second idler gears is respectively transmitted via the first or second end gears and said displaceable floating gear to said Leadscrew drive gear to turn said Leadscrew causing said carrier unit to move laterally in a desired direction, thus displacing said drive chain from an existing sprocket gear onto a desired sprocket gear of the plurality of sprocket gears.

* * * * *